United States Patent

[11] 3,615,318

| [72] | Inventors | Robert F. Jagodzinski, Maumee; Louis Spanoudis, Toledo, both of Ohio |
|---|---|---|
| [21] | Appl. No. | 657,488 |
| [22] | Filed | Aug. 1, 1967 |
| [45] | Patented | Oct. 26, 1971 |
| [73] | Assignee | Owens-Illinois, Inc. |

[54] DECORATING PROCESS
17 Claims, No Drawings

[52] U.S. Cl. .................................. 65/30, 65/33, 65/60, 109/39
[51] Int. Cl. .................................. C03c 15/00, C03c 29/00
[50] Field of Search .......................... 65/33, 30, 60; 109/39; 106/39

[56] References Cited
UNITED STATES PATENTS

| 2,515,937 | 7/1950 | Stookey | 65/66 X |
| 2,971,853 | 2/1961 | Stookey | 65/33 X |
| 2,515,940 | 7/1950 | Stookey | 65/33 X |
| 2,663,658 | 12/1953 | Schurecht | 65/30 X |
| 2,825,634 | 3/1958 | Rindine | 65/30 X |
| 3,113,877 | 12/1963 | Janakirama-Rau | 65/33 X |
| 3,282,770 | 11/1966 | Stookey et al. | 65/30 X |
| 3,313,644 | 4/1967 | Morrissey | 65/33 X |
| 3,397,076 | 8/1968 | Little et al. | 65/33 X |
| 3,428,466 | 2/1969 | Wolf et al. | 106/39 UX |
| 3,445,209 | 5/1969 | Asunmaa | 65/30 X |
| 3,454,386 | 7/1969 | Ernsberger | 65/33 |
| 3,464,807 | 9/1969 | Pressau | 65/33 X |
| 3,464,880 | 9/1969 | Rinehart | 65/30 X |
| 3,480,459 | 11/1969 | Asummaa | 65/30 |

OTHER REFERENCES

Surface Nucleation and Crystal Orientation in Lithium Silicate Glass Fibers — by Booth and Rindine — Journal of American Ceramic Society, Vol. 47, No. 1, Jan. 21, 1964, found in class 65, subclass 33, pages 25 to 29.

Primary Examiner — Frank W. Miga
Attorneys — W. A. Schaich and Donald R. Bahr

ABSTRACT: A process for selectively decorating a transparent, glass-ceramic body or a thermally crystallizable glass body by the steps of coating selected surface areas with a compound or composition which is capable of selectively absorbing electromagnetic radiation, exposing the coated area to a source of electromagnetic radiation for a period of time so as to cause the glass-ceramic or glass body immediately under the coated areas to be heated to effect formation of opaque glass-ceramic surface areas on said body.

DECORATING PROCESS

The present invention is concerned with a process for selectively decorating an opacifiable or crystallizable glass or a transparent glass-ceramic. The process comprises selectively heating surface portions of such starting materials to thermally convert such heated portions to an opaque state. This selective heating is accomplished by coating the areas to be decorated with a substance having a high absorptivity for selected electromagnetic radiation, and then exposing the coated area to said selected electromagnetic radiation.

Glass-ceramic and glass objects are widely used, for example, as cooking and eating utensils. In order to improve the aesthetic qualities of these objects, utensils formed from these materials are often decorated. In the past, glass-ceramic and glass bodies have been decorated by a wide variety of means. For example, simple organic coatings can be applied which may be subsequently heat-cured in order to improve their bonding to the base material. Likewise, unfused ceramic coatings can be applied to glass-ceramic or glass objects of the subject type and subsequently fused to the base object by heat.

All of the above described prior art decorating means have one common disadvantage, that is, in all cases the decorating medium is applied as an overlay to the base object. Accordingly, the overlay decoration does not have the durability of the base object in that it can be easily worn away, leaving an unsightly surface. In contrast, the subject invention is concerned with a process for decorating glass-ceramic and glass objects wherein the decoration is effected in situ within the surface of the base article and, as such, cannot be worn away. That is, the decoration as effected in accordance with this invention, is good for the life of the object and will not become worn as a result of heavy usage.

As stated, the invention is applicable to the decoration of clear glasses which are, however, thermally crystallizable, as well as to the decoration of glass-ceramic materials that have previously been crystallized to transparent glass-ceramics but are, nevertheless, capable of conversion to opaque glass-ceramics by further heating for example, see the type of glass-ceramic disclosed in U.S. Pat. application, Ser. No. 630,507, now abandoned filed Apr. 13, 1967. As is well known, a glass-ceramic is a semicrystalline material containing a multitude of finely divided, randomly oriented crystals throughout the body. Such crystals are formed by controlled thermal in situ crystallization of the glass. Glass-ceramics are to be distinguished from opal glasses which are still glasses having substantially the same viscosity characteristics as the original glass before they are opacified. A glass-ceramic does not have the viscosity characteristics of a glass even though it contains some glass; its annealing point temperature is at least 100° F. higher than the annealing point temperature of the original crystallizable glass because of the relatively high amount of crystals present. The annealing point temperature is the temperature at which the viscosity of the glass is $10^{13.4}$ poises, as determined by ASTM Designation C 336–54To 336–

The primary object of this invention is to provide a process for decorating glass-ceramic and glass bodies.

Another object of this invention is to provide a process for effecting the decoration of transparent glass-ceramic or thermally crystallizable glass bodies by selective heating.

Still another object of this invention is to provide the decorated glass-ceramic or glass bodies which are produced in accordance with this invention.

Finally, the objects of this invention include all the other novel features which will be obvious from the specification and claims at hand.

It is to be noted that the process of this invention can be practiced in such a way as to produce an opaque surface only on selected areas or on the entire surface of the body in question in accordance with this invention. By this latter mentioned embodiment, articles having outstanding strength properties are produced due to the fact that the surface area is in compression.

By means of the subject invention, this crystallization potential can be advantageously utilized in the decoration of the object in question. In accordance with this invention, transparent glass-ceramic or thermally crystallizable glass articles are formed, and thereafter a portion of the article is coated with a material which is capable of selectively absorbing electromagnetic radiation, releasing heat in the process. By means of this selective absorption of electromagnetic radiation, that portion of the article which is immediately under the coated area is heated to such a degree that opaque glass-ceramic surface areas are formed. Accordingly, a visible decorative pattern is provided under the coated areas.

Any type of electromagnetic radiation can be utilized in accordance with this invention, provided the radiation is capable of absorption and upon absorption causes a heating phenomena. Examples of suitable forms of electromagnetic radiation are infrared, radio frequency, energy, etc.

For use in accordance with this invention, infrared energy is the preferred form of electromagnetic radiation. This form of electromagnetic radiation is preferred in that apparatus is readily available which is capable of generating infrared radiation, and radiation of this type is readily absorbed and, upon absorption, high localized heating results.

The infrared radiation as used in this invention can have a wavelength of from about 1.10 to about 2.5 microns. The more preferred range of the wavelength of the infrared radiation is from about 1.10 to about 1.8 microns. The most preferred radiation as used in accordance with this invention has a wavelength of about 1.15 microns.

The power intensity of the infrared radiation can be from about 40 to about 400 watts per lineal inch. The more preferred power intensity is from about 120 to about 400 watts per lineal inch. The most preferred power intensity is 400 watts per lineal inch.

A wide variety of substances can be used as radiation absorbing means in accordance with this invention. Examples of suitable radiation absorbing coating compositions for use in accordance with this invention are nickelous oxide, stannic oxide, strontium oxide, barium carbonate, graphite, ceric oxide, magnesium oxide, zinc oxide, chromic oxide, titanium dioxide, manganous oxide, etc.

Powdered metals can also be utilized as electromagnetic radiation absorbing media in accordance with this invention. Examples of suitable metal powders are magnesium, calcium, aluminum, tin, lead, zirconium, titanium, antimony, chromium, iron, cobalt, nickel, platinum, iridium, osmium, palladium, rhodium, etc.

Mixtures of the above described radiation absorbing means can also be used in accordance with this invention.

It is understood by one skilled in the art that the radiation absorbing media must be matched to the source of electromagnetic radiation utilized. For example, if a source of infrared radiation is utilized, it is necessary to have an absorbing media which is capable of absorbing infrared radiation.

Specifically, when an infrared radiation source is utilized, the preferred radiation absorbing media are nickelous oxide, graphite, chromic oxide, stannic oxide, and zinc oxide. For use in conjunction with an infrared radiation source, the most preferred radiation absorbing medium is nickelous oxide.

Likewise, the radiation absorbing medium must be selected in accordance with its physical properties, notably, the temperature at which it tends to fuse. The temperature at which opaque crystal formation occurs in glass-ceramic and thermally crystallizable glass bodies is generally known. A radiation absorbing medium should be selected which will permit the surface under the radiation absorbing media to rise to such temperature without fusing the radiation absorbing medium. The fusion of the radiation absorbing medium is usually undesirable in that it tends to make removal of the radiation absorbing medium after the decoration step difficult.

The radiation absorption media as used in accordance with this invention can be applied by any conventional means. However, for use in accordance with this invention, it is preferred that the radiation absorbing composition be applied as a slurry or paste. Examples of suitable liquids which can be used to form slurries are water, alcohol, oils, etc. Due to its availability and the fact that it evaporates without leaving residual material, water is a preferred slurry medium for use in applying the radiation absorbing composition of this invention.

Subsequent to the decorating step, the radiation absorbing medium can be removed by mechanical means such as rubbing or brushing. This removal can likewise be effected by washing with a solvent such as water, alcohol, etc.

Decoration can be effected by the process of this invention on any base material which is capable of in situ formation of opaque crystals. Soda lime and borosilicate glasses to which opacifying agents have been added are capable of in situ crystallization and, as such, can be decorated in accordance with the process of this invention. Likewise, glass-ceramic materials can be decorated by the process of this invention. Examples of suitable glass-ceramic materials which can be decorated by the process of this invention are low expansion lithium aluminosilicate glass-ceramics, including magnesium lithium alumino silicate. The latter mentioned glass-ceramic material is a preferred base material for use in this invention, wherein titanium dioxide, $ZrO_2$, or a mixture of these, is used as a nucleating agent for the formation of crystals.

The degree to which the in situ crystal formation if effected is dependent in part upon the time to which the radiation-absorbing medium is exposed to the radiation source. The longer the exposure, the greater is the localized heating under the area which is coated with the radiation-absorbing medium. The optimum exposure time is dependent on the depth to which crystallization is desired. It should be noted, however, that the longer the exposure time, the greater is the diffusion of the heat throughout the base material. Accordingly, the resolution and hence, sharpness, of the resulting decorative pattern is dependent on exposure time. That is, at longer exposure times, the opaque crystal formation is not confined to the coated area but, instead, tends to diffuse beyond the boundaries of the coated area so that a blurred or distorted decorative image is produced.

When using the preferred infrared radiation, the exposure time can be from about 0.25 to about 10.0 minutes. A more preferred range of time for the exposure is from about 0.75 to about 4.0 minutes. A most preferred exposure time is 2.5 minutes. It is understood that the exposure time is dependent on the power intensity of the radiation source utilized. The above listed exposure times are for power intensities of from about 1.0 to about 4.0 kilowatts at a voltage of from about 90 to about 220 volts. A more preferred power range is from about 1.7 to about 3.7 kilowatts at a voltage of from about 125 to about 210 volts. A most preferred power range for use in decorating utilitarian objects such as dishes, bowls, etc. is 2.3 kilowatts at a voltage of 155 volts.

Any conventional infrared energy source which is capable of meeting the above described power requirements can be used in this invention. A most convenient means for achieving the opaque crystal formation in accordance with this invention is by the utilization of a dual elliptical reflector clam shell infrared furnace. This furnace is capable of impinging all the infrared energy from two independent sources on a central point. Furnaces of this type are produced by Research, Incorporated, P.O. Box 6164, Minneapolis Minn. 55424.

The following examples will illustrate the subject invention. These examples are given for the purpose of illustration and not for purposes of limiting this invention.

EXAMPLE 1

1/4 inch diameter glass rod having a composition as listed in table 1 was coated with an aqueous slurry of nickelous oxide to form a decorative pattern. The thickness of the coating was 10 mil. This coating thickness was used throughout examples 1-7.

TABLE 1

|  | Parts by Weight |
|---|---|
| $F_2$ | 0.1 |
| $SiO_2$ | 70.1 |
| $Al_2O_3$ | 16.5 |
| $Li_2O$ | 3.51 |
| $MgO$ | 3.9 |
| $Fe_2O_3$ | 0.42 |
| $TiO_2$ | 1.75 |
| $P_2O_5$ | 1.45 |
| $ZrO_2$ | 1.39 |
| $As_2O_3$ | 0.19 |
| $Na_2O$ | 0.73 |

The coated rod was then placed in a high energy heat flux infrared energy furnace. The power intensity was such that a peak of 2.1 to 2.5 kilowatts at 146 to 163 volts was achieved. The nickelous oxide coating absorbed the infrared energy to a greater degree than the glass base, with the result that selective overheating of the coated area resulted. This overheating caused selective surface crystallization under the coated area to form an opaque glass-ceramic. After the rod cooled, the nickel oxide slurry was removed, leaving an in situ crystallized decorative pattern on the glass rod.

The furnace used in examples 1-7 was a Dual Elliptical Reflector infrared furnace manufactured by Research Incorporated. It contains two hi-intensity General Electric quartz lamps. Each lamp draws approximately 9 amps. at 220 volts. The current is controlled by a variac which has graduation for 0 to 100. The amount of power drawn by the lamp at various settings are as follows: The infrared radiation produced at the specified wave lengths is not monochromatic. Instead, the specified wavelengths are the wavelengths at which the infrared energy peaks.

| Setting on Variac | Volts | Amps | Watts | Wavelength in Microns |
|---|---|---|---|---|
| 10 | 22 | 5 | 110 | 2.5 |
| 20 | 44 | 7 | 348 | 2.0 |
| 30 | 66 | 10 | 660 | 1.86 |
| 40 | 88 | 11 | 968 | 1.65 |
| 50 | 110 | 12 | 1,320 | 1.50 |
| 60 | 132 | 14 | 1,858 | 1.36 |
| 70 | 154 | 15 | 2,310 | 1.33 |
| 80 | 175 | 16 | 2,800 | 1.27 |
| 90 | 198 | 16.5 | 3,170 | 1.20 |
| 100 | 220 | 17.5 | 3,850 | 1.15 |

EXAMPLE 2

A section of tubing formed from a thermally crystallizable glass having a composition as listed in table 2 was coated with an aqueous slurry of nickelous oxide.

The method of the invention, can utilize, among others, the crystallizable glasses and the resulting transparent crystallized glasses of the kind prepared in accordance with the disclosures contained in copending application, Ser. No. 630,507, filed Apr. 13, 1967. In this specific example, a transparent glass-ceramic of essentially the composition set forth in example 3 of said copending application and in table 2 herein, heat treated by holding at 1,300° F. for 4 hours, followed by holding at 1,450° F. for 2 hours, and having an average linear coefficient of thermal expansion over the range 0–300° C. of $-1.1 \times 10^{-7}/C°$, was used as the starting material in the form of ½-inch tubing. This tubing was coated with an aqueous slurry of nickelous oxide.

TABLE 2

| | Parts by Weight |
|---|---|
| $SiO_2$ | 69.2 |
| $Al_2O_3$ | 17 |
| MgO | 2.2 |
| ZnO | 2.2 |
| $Li_2O$ | 3.5 |
| $ZrO_2$ | 1.4 |
| $TiO_2$ | 1.8 |
| $P_2O_5$ | 1.5 |
| F | 0.1 |
| $Sb_2O_3$ | 0.5 |
| $K_2O$ | 0.2 |
| $Na_2O$ | 0.5 |

The coated glass tubing was then exposed to a source of infrared radiation as described in example 1 for a period of 60 seconds at a power intensity such that a peak 1.8 microns at 3.8 kilowatts was achieved. Upon cooling, the nickelous oxide was removed from the tubing. Selected crystallization occurred under the coated portions of the glass tubing with the result that an opaque decorative pattern was formed on the otherwise still transparent glass-ceramic tubing.

EXAMPLE 3

A ¼-inch diameter glass tube, having the composition as listed in example 1, was partially coated with a mixture of $SnO_2$ in an oil vehicle. The coated tube was placed in a preheated furnace (650° F.) in order to eliminate any oil residue. Thereafter, the coated tube was placed in the infrared furnace and heated for 2.5 minutes at an input of 3.0 to 3.4 kilowatts (voltage—195 to 205). Upon cooling, it was noted that the coated area had crystallized (become opaque) as compared to the vitreous, transparent state of the remaining uncoated portion of the sample.

EXAMPLE 4

The procedure of example 3 was repeated with the exception of using a mixture of using a mixture of ZnO and oil vehicle. The coated tube was placed in the infrared furnace and heated for 4 minutes at an input of 2.1 to 2.5 kilowatts (voltage—150 to 160.) The result was a crystallized area beneath the coating. The remainder of the sample was in its previously vitreous, transparent state.

EXAMPLE 5

The preliminary steps are the same as in example 3, with the exception of using a mixture of 75 percent NiO and 25 percent graphite in an oil vehicle. The coated tube was placed in the infrared furnace and heated 50 seconds at an input of 3.0 to 3.4 kilowatts (voltage—195 to 205). The result was an in situ crystallized opaque area beneath the coating. The remainder of the sample was in its previously vitreous, transparent state.

EXAMPLE 6

A ¼-inch diameter, transparent, glass-ceramic tube as described in example 2 was partially coated with a mixture of 50 percent MgO and 50 percent NiO in an oil vehicle. The coated tube was placed in the infrared furnace and heated for 1.0 minutes at an input of 3.0 to 3.4 kilowatts (voltage—195 to 205). The result was an opaque glass-ceramic area beneath the coating, the remainder of the sample still transparent.

EXAMPLE 7

The preliminary steps are the same as in example 6, with the exception of using $Cr_2O_3$ and an oil vehicle. The coated article is placed in the infrared furnace and heated for 50 seconds at an input of 3.2 to 3.6 kilowatts (voltage 200 to 210).

Selective formation of an opaque decoration under the areas coated with $Cr_2O_3$ was effected.

Modifications may be resorted to within the spirit and scope of the appended claims.

What is claimed is:

1. A process for decorating an article formed of transparent glass ceramic body or thermally crystallizable glass comprising the steps of:
   coating at least a selected surface portion of said article according to a desired pattern of decoration with a removable electromagnetic radiation absorbing coating composition possessing the characteristics of absorbing and converting high intensity electromagnetic radiations into heat; said composition being selected from the group consisting of graphite, metal oxides and powdered metal,
   exposing the article having at least selected surface portions thereof coated with said coating composition to a source of energy consisting essentially of infrared radiation having a wavelength of from about 1.1 to about 2.5 microns for at least about 0.25 minutes and which is of sufficiently high intensity to be absorbed and converted by said coating composition into sufficient heat to rapidly elevate the temperature of said coating to a temperature within the thermal crystallization temperature range of said article;
   and thereby heating the surface coated portion of said article by permitting the converted heat to flow from said surface coating to the underlying surface portion of said article;
   said radiation heating being sufficient to initiate nucleation and thermally crystallize a substantial portion of said underlying surface portion of said article to thereby opacify said selected portions of the transparent article according to the desired pattern of decoration,
   said radiation heating being insufficient to fuse said coating composition to said article and said coating being removable from said article by washing.

2. The process as defined in claim 1 wherein the infrared radiation has a power intensity of at least about 1 kilowatt at a voltage of at least about 90 volts.

3. The process as defined in claim 1 wherein the body is formed of an aluminosilicate glass or glass ceramic.

4. A process for producing in situ crystallization within the surface layer region of an article formed of a thermally crystallizable glass or an article formed of a partially crystallized glass capable of conversion to a more highly surface crystallized condition, comprising the steps of:
   coating at least a selected surface portion of said article with a removable electromagnetic radiation absorbing coating composition possessing the characteristics of absorbing and converting high intensity electromagnetic radiation into heat; said composition being selected from the group consisting of graphite, metal oxide and powdered metal,
   exposing the resulting surface coating to a source of energy consisting essentially of infrared radiation having a wavelength of from 1.1 to about 2.5 microns for at least about 0.25 minutes which is of sufficiently high intensity to be absorbed and converted by said surface coating into sufficient heat to rapidly elevate the temperature of said surface coating to a temperature within the thermal crystallization temperature range of the article,
   and thereby heating the surface coated portion of said article by permitting such converted heat to flow from said surface coating to the underlying coated surface layer portion of said article,
   continuing said radiation for sufficient duration to initiate nucleation and thermally crystallize a substantial portion of said underlying surface layer in said selected portions of the article,
   said radiation heating being insufficient to fuse said coating composition to said article and said coating being removable from said article by washing.

5. A process as defined in claim 4, wherein said electromagnetic radiation absorbing composition comprises graphite.

6. A process as defined in claim 4, wherein said electromagnetic radiation absorbing composition comprises stannic oxide.

7. A process as defined in claim 4, wherein said electromagnetic radiation absorbing composition comprises strontium oxide.

8. A process as defined in claim 4, wherein said electromagnetic radiation absorbing composition comprises barium carbonate.

9. A process as defined in claim 4, wherein said electromagnetic radiation absorbing composition comprises ceric oxide.

10. A process as defined in claim 4, wherein said electromagnetic radiation absorbing composition comprises zinc oxide.

11. A process as defined in claim 4, wherein said electromagnetic radiation absorbing composition comprises chrome oxide.

12. A process a defined in claim 4, wherein said electromagnetic radiation absorbing composition comprises titanium dioxide.

13. A process as defined in claim 4, wherein said electromagnetic radiation absorbing composition comprises magnesium oxide.

14. A process as defined in claim 4, wherein said electromagnetic radiation absorbing composition comprises manganous oxide.

15. A process as defined in claim 4, wherein said electromagnetic radiation absorbing composition comprises nickelous oxide.

16. A process as defined in claim 4, wherein said glass-ceramic body is a glass-ceramic body selected from at least one of the group consisting of lithium alumino-silicate glass ceramics and magnesium lithium alumino-silicate glass-ceramics.

17. A process as defined in claim 4, including the step of removing said removable surface coating after thermally crystallizing said underlying coated surface portion of said glass body.

UNITED STATES PATENT OFFICE
CERTIFICATE OF CORRECTION

Patent No. 3,615,318         Dated October 26, 1971

Inventor(s) Robert F. Jagodzinski and Louis Spanoudis

It is certified that error appears in the above-identified patent and that said Letters Patent are hereby corrected as shown below:

Title page, under "References Cited", patentee listed for U.S. Pat. No. 2,825,634 should be --Rindone--; patentee listed for U.S.Pat.No. 3,113,877 should be --Janakirama-Rao--; and patentees listed for U.S.Pat.No. 3,480,459 should be --Asummaa et al-- Column 1, line 55, after "54" delete "To 336-" and insert therefor --T.--; Column 5, line 42, delete "of using a mixture" (second occurrence).

Signed and Sealed this

Twenty-fifth Day of January 1977

[SEAL]

Attest:

RUTH C. MASON
Attesting Officer

C. MARSHALL DANN
Commissioner of Patents and Trademarks